350-166
SEARCH ROOM
June 12, 1956 D. H. KELLY 2,749,792
LIGHT DIVIDING SYSTEM
Filed Feb. 1, 1952 2 Sheets-Sheet 1
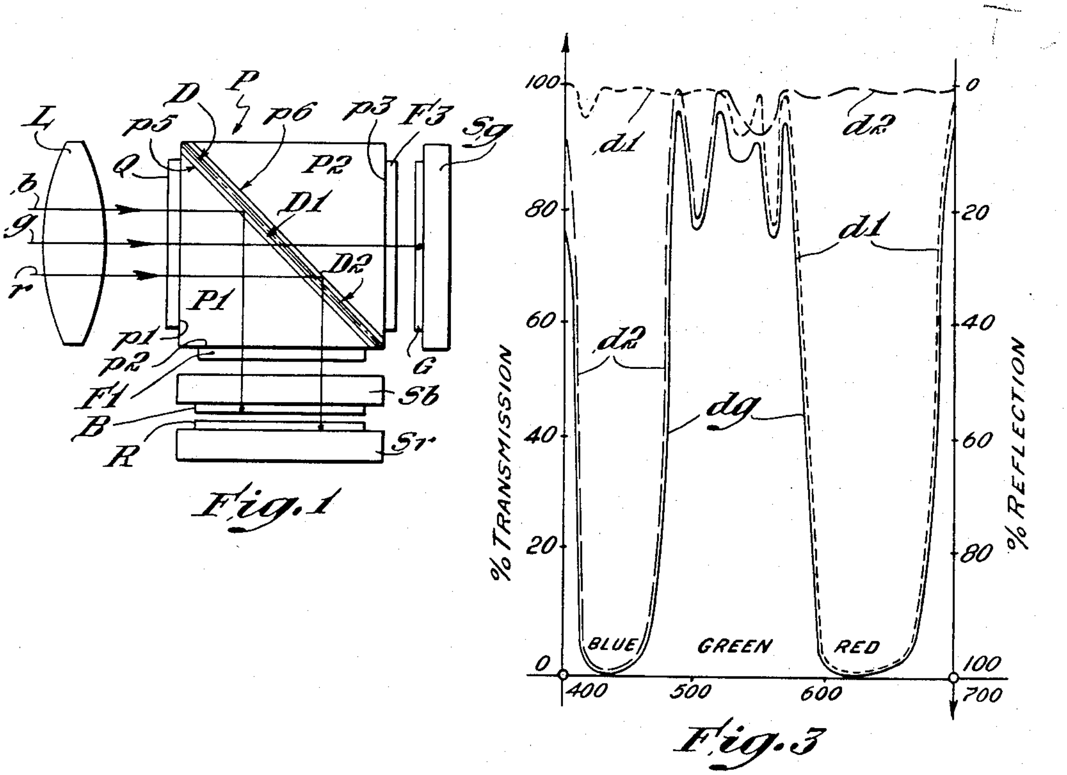
Fig. 1
Fig. 3
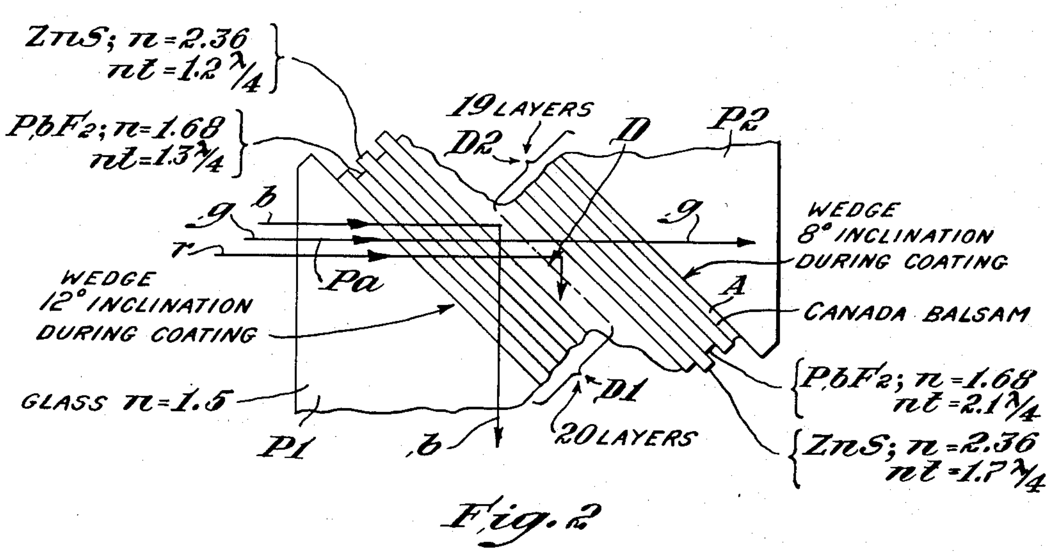
Fig. 2
Inventor
Donald H. Kelly
by Roberts, Cushman & Grover
att'ys.

LIGHT DIVIDING SYSTEM

Filed Feb. 1, 1952 2 Sheets-Sheet 2

Inventor
Donald H. Kelly
by Roberts, Cushman & Grover
att'ys.

2,749,792

LIGHT DIVIDING SYSTEM

Donald H. Kelly, Los Angeles, Calif., assignor to Technicolor Motion Picture Corporation, Hollywood, Calif., a corporation of Maine Application February 1, 1952, Serial No. 269,525

9 Claims. (Cl. 88—1)

Various branches of the optical art, particularly color photography and color television, involve several coexisting but spatially distinct images of the same object field, each image representing a given spectral range. The separation or combination of such images should be accomplished with a minimum loss of light in its range in order to secure the maximum effect relative to the material from or onto which the image is projected, such as photographically sensitive emulsions, transparencies for additive projection, photoelectrically sensitive screens of television cameras, or electron responsive screens of television viewing apparatus.

Several types of arrangements for accomplishing the above indicated purposes have been suggested, and prominent among these are systems employing so-called light dividing surfaces or transparent reflectors which separate an incident light beam into a transmitted and a reflected beam or combine two component beams.

Such systems may have one or more light dividing surfaces. A single surface provides two beams for two-color systems, but it can also be utilized for work with three or more color aspects if two or more image receiving or sending surfaces are introduced in one or both component light beams. An example of such arrangements is the three color camera described in U. S. Patent No. 2,072,091, which utilizes a prism with a single dividing surface directing component beam towards two apertures, a green (*g*) recording film being exposed in one aperture and a so-called bipack with super-imposed blue (*b*) and red (*r*) recording films in the other aperture. Systems with more than two component beams are for example disclosed in U. S. Patent No. 2,189,932.

In arrangements employing two superimposed image responsive surfaces, the light which reaches the rear surface is inherently affected by the front surface. This is in some aspects a disadvantage which is however often outweighed by the fact that a two-beam arrangement provides shorter overall optical path lengths or avoids structural complications, thus facilitating combinations with lens systems of reasonably short focal lengths and also inherently causing less loss of light along the optical path. Further, particularly if applied to motion picture cameras, such arrangements somewhat simplify the mechanical film handling mechanism and the problems of alignment and image registration.

However due to the above mentioned limitations inherent in superimposed surfaces, the effective speed of the rear emulsion surface is reduced by the light absorption of the components in front thereof which in this instance usually comprises color filters in addition to the front emulsion and its support.

The usefulness of apparatus of this type depends upon the ultimately available light energy which is never sufficiently abundant. Therefore the overall or system efficiency, that is the ratio of actually utilized to initially available light energy of each component beam, is of the utmost importance.

It has been proposed to improve overall efficiency of light dividing systems including the type disclosed in U. S. Patent No. 2,000,058, by introducing semi-dichroic thin layer reflectors which transmit nearly all of the light in the blue and red ranges to an aperture containing the blue and red recording emulsions and reflect the green range to a second aperture. While it is feasible to coat satisfactory reflectors for systems of that type, it is rather difficult to produce reflectors which transmit green while reflecting nearly all of the blue and red light, an arrangement particularly advantageous for use in cameras such as disclosed in U. S. Patent No. 2,072,091. Systems of the latter type present a fundamentally different problem from that having the bipack in the direct beam. This problem is that of reflecting with high efficiency two fixed spectral bands which are separated by a third band not to be reflected. This situation is different from that encountered in systems with only two recording emulsions where a single range for example the red-orange band is reflected and the blue-green band is transmitted or vice versa. The situation is even different from that encountered in systems with three recording emulsions in two apertures wherein either the red and green recording films or the green and blue recording films are superposed. In cases where the green recording emulsion is superposed on another emulsion, the two color ranges to be reflected are adjacent in the spectrum. Such adjacent bands can be considered as a single reflection band, not separated by intervening ranges. The construction required to obtain high efficiency reflection of a given band width in a single band reflector does not produce the same results in reflectors for two separated bands and may in fact be detrimental to the desired qualities. Expedients available for controlling efficiency and band width of single band reflectors are changes in the thickness of individual layers of dielectric material, and increasing the number of layers comprising the reflector. A third expedient is the combining of the effects of two identical reflectors spaced just far enough apart to avoid unwanted optical interference, by means of interposed optical material. None of these expedients nor any combination thereof is sufficient to provide a blue-red reflector with band width and efficiency characteristics comparable to those of the best single band reflectors, if the individual layers are made thick enough to reflect both red and blue light.

It is one of the main objects of the present invention to provide a light dividing system wherein two spectral ranges separated by a third range are reflected with high overall efficiency while the third range is transmitted, and with the aid of which color selection and balance can be easily and exactly controlled. Another object is to provide a particularly efficient light splitting system for photographic cameras wherein the blue and red recording films are exposed in a single component beam reflected within a light dividing system, whereas the green recording film is exposed in a second transmitted beam. Additional objects are to provide systems of the above type which are comparatively inexpensive in manufacture, easy to test and to supervise during manufacture and use, and generally to advance the art of optical systems with components that relate several image carrying colored light beams.

According to the invention, optical apparatus for correlating component images of different spectral ranges comprises a light transmitting body having a surface obliquely intersecting a light beam defined by suitable optical means and on this surface two selectively reflecting transparent coatings each of which coatings has a number of layers of fractional wave length thicknesses, and of materials having alternatingly high and low indices of refraction respectively, the number, thickness and material of the layers of the coatings being such that one coating reflects a first spectral range and transmits a second and third spectral range, and the second coating reflects the third range and transmits the second range.

In another aspect, the objects of the invention are accomplished by the combination of a transparent body having at least three outer light transmitting surfaces and at least one inner light dividing surface inclined to the outer surfaces, aperture devices such as film gates adjacent two outer surfaces with responsive image material such as photographic emulsions confined in the holding devices, on the light dividing surface a thin multilayer dichroically selective reflector which transmits two spectral ranges and which reflects a third spectral range, and on the dividing surface a second dichroically selective reflector which transmits one and reflects the second of said two spectral ranges.

In a further aspect, the invention concerns a device for dividing a light beam into two component beams of selected spectral ranges for exposure of sensitive emulsion material confined in respective apertures which device comprises a transparent body having a surface which is inclined to the beam, and on the surface two dichroically selective reflectors each including a number of selectively reflecting dielectric coatings of fractional wave length thickness and of alternating high and low indices of refraction, the number and thickness of the layers of the front reflector being selected to reflect substantially exclusively light of the red or blue spectral range while transmitting towards the rear reflector light of the blue and green or green and red, respectively, spectral ranges, and the number and thicknesses of the layers of the rear reflector being selected to reflect light of the blue or red spectral range respectively while transmitting light of the green spectral range.

This is a continuation-in-part of application Serial No. 70,195, filed January 11, 1949, now abandoned.

Other objects, aspects and features will appear, in addition to those contained in the above statement of the nature and substance including some of the objects of the invention, from the herein presented outline of its basic principles and from the following description of several typical practical embodiments illustrating its novel characteristics. The outline and description refer to drawings in which:

Fig. 1 is a schematical view of a light dividing system incorporating the invention;

Fig. 2 is an enlarged view of the superimposed coatings shown in Fig. 1;

Fig. 3 is a diagram illustrating the transmission-reflection characteristics of coatings according to Fig. 2;

Figure 4:
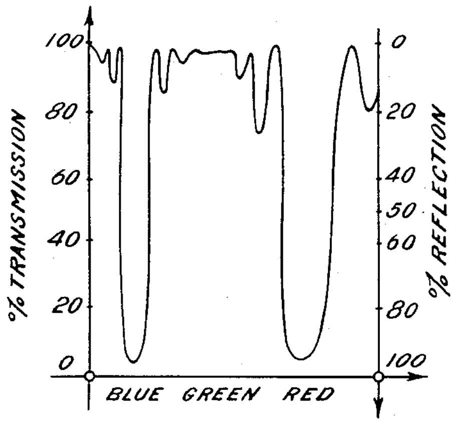
Fig. 4 is a diagram similar to Fig. 3, illustrating the characteristics of a prior art reflector.

The general arrangement of light splitters of the type according to the invention is shown in Fig. 1 where L is a lens system constituting an entrance aperture, P is a prism cube with components P1 and P2 having light transmitting outer surfaces *p*1, *p*2 and *p*3 and a dividing region D of adjacent internal dividing surfaces *p*5, *p*6 which confine two groups or coatings D1, D2 of thin dielectric layers to be described in detail below. Incident visible radiation is indicated by blue, green and red rays *b*, *g* and *r* representing respective beams of colored light. Beam *g* is transmitted and records the green aspect image on an emulsion G on support S*g*, whereas the reflected beams *b* and *r* record the blue and red aspect images on the emulsions B and R supported on S*b* and S*r* respectively. For purposes to be discussed below a quarter wave plate Q can be inserted between lens and prism systems. Filters F1 and F2 can be inserted between prism and recording materials, if it should appear desirable to modify the cut or intensity of the respective beams. The coatings D1, D2 can be wedge shaped, with a gradient selected for purposes discussed below.

Fig. 2 shows the detail construction of the two coatings D1 and D2. The coating D1 deflects blue and transmits green and red light, whereas the coating D2 reflects red light and transmits blue and green light. Each one of these transmitter-reflectors can be made highly efficient since it only has to separate two spectral ranges. The coatings D1 and D2 are preferably superimposed directly on one of the surfaces *p*5 or *p*6, or they can be separately applied to the surfaces *p*5, *p*6 of the prism components P1, P2 respectively. In either case components P1, P2 are cemented together with a suitable optical adhesive, as indicated at A of Fig. 2 for directly superimposed coatings. The reflection characteristics of each coating or group of layers are adjusted with respect to the characteristics of the respective beam paths, including the refractive indexes of the prisms P1 and P2 and of the cement, and the properties of the recording material and of the filters if such are used.

Two identical coatings have previously been combined for the purpose of producing a structure which reflects a single band. According to the present invention the reflectors are different and each coating is optically independent of the other so that the efficiency of each reflection band can be increased considerably without significantly affecting the band widths. This noninterfering combination of two multilayer coatings produces two separate reflection bands of suitable band width which could be accomplished neither by a single reflector with intermingled layers dimensioned to reflect two respective wave lengths such as in the blue-red regions, nor by two identical or nearly identical reflectors; according to my invention the two reflectors must be of different construction one producing one and the other a different reflection band.

In the specific embodiment shown in Fig. 2, the dividing region D comprises two component coatings D1 and D2 for reflecting blue and red light respectively, each coating having a fairly high number of layers in order to provide high reflection intensities and steep spectral cuts. In a successful practical embodiment, a blue reflecting coating with twenty layers and a red reflecting coating with nineteen layers was used, the layer materials being zinc sulphide for the high index and lead fluoride for the lower index layers. As indicated above, the coatings may be applied, by appropriate evaporation methods, to respective faces of prisms P1 and P2, or all layers of both coatings can be coated directly on top of each other on the hypotenuse surface of one component prism, for example P1, whereupon the coated surface is cemented to the uncoated surface of the other prism such as P2. The numerical data for the coatings are indicated in Fig. 2, where *n* indicates indexes of refraction and *nt* the optical thickness. The *nt* values are referred to the center of the layers where they intersect the system axis P*a* (ray *g* of Fig. 1) at 45° with *t* measured perpendicular to the coating.

The proper coating thickness and, if desired, wedge gradient can be determined by empirically correlating the theoretical values with the performance data of the coating apparatus used, including provisions for wedge coating such as inclination of the specimen surface, during evaporation, to the plane appropriate for coating with uniform thickness. Prisms of the type described below with reference to Fig. 5, furnishing color distribution which is uniform for photographic purposes, have been obtained by applying the blue reflecting coating to its prism face tilted during application at an angle of 12° to the plane which would provide uniform coating thickness, and by applying the red reflecting coating to the prism face tilted at an angle of 8°. The theoretical requirement for visual uniformity does not necessarily provide photographic uniformity, and this accounts for the fact that the longer and shorter wave length reflecting coatings are given the comparatively smaller and larger wedge gradients, respectively, in this particular example. The optical thickness *nt* of each layer of reflector D2 (reflecting red, and transmitting blue and green light) is one quarter of a wave length of red light, whereas the optical thickness of each layer of the reflector D1 (reflecting blue, and transmitting green and red light) is one quarter of a wave length of blue light. The wave length in each instance is that at which peak reflectance is desired. Other quarter wave multiples of these wave lengths may be chosen for some or all of the layers if it is desirable to change the band widths of either reflector. The mechanical thickness *t* of each layer may be obtained according to the formula $$t=\frac{\lambda}{4n \cos \theta}$$

where $$\theta \text{ equals arc sin } .707\frac{N}{n}$$

(for the axial ray), N is the index of refraction of the glass used for the prism, *n* is the index of refraction of the layer concerned, and λ is the peak wave length of the desired reflection band.

A satisfactory cement for joining the two prism components is isobutyl-methacrylate dissolved in xylene to furnish a solution having the consistency of honey. It was found that separation of the two coatings D1, D2 is not indispensable to prevent undesirable interference effects. A thickness $$T=\frac{(20 \text{ to } 30)\lambda}{N}=0.0002 \text{ to } 0.0003 \text{ inch}$$

of a cement layer of the above material was found to be satisfactory, with N being the index of refraction of the cement and λ the peak wave length. The thickness of the cement layer is not nearly as critical as it is in a beam splitter which obtains both reflection ranges, for example the red and blue ranges, from two reflectors which are alike. The range of thickness tolerance of the cement layer is very large as compared to that of the dielectric layers.

The light separation obtained with a double dichroic reflector according to Figs. 1 and 2 is illustrated in Fig. 3 wherein transmission and reflection percentages are plotted versus wavelength. In this figure, *d1* (dotted line) is the characteristic curve of the red reflecting layer group D2, whereas *d2* (dashed line) is the corresponding curve for the blue reflecting layer group D1. The curve *dg* gives the spectral characteristic of the green range, transmitted by layer group D1 as well as D2.

The above band configurations are much more favorable than those of the above mentioned known magenta reflecting light dividers with two identical coatings; the characteristic of such a conventional reflector is shown in Fig. 4 for purposes of comparison with Fig. 3.

Figure 5:
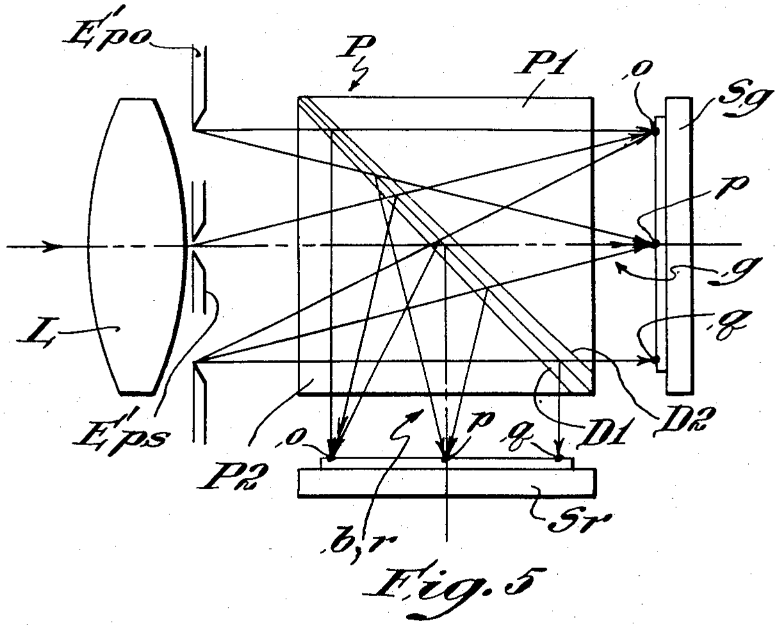
Fig. 5 is a schematical view similar to Fig. 1 illustrating the function of wedge shaped coatings.

The appropriate layer thicknesses must prevail in the direction of the light path through the beam splitter and the thickness formula therefore contains the factor cos θ, which will vary depending on the angle between reflectors and the incident rays. In order to provide favorable conditions for a given purpose, each layer can be deposited in the shape of a slight wedge with the thinner end or edge nearest to the lens system. For purposes of color photography with systems according to Figs. 1 and 2, it was found that relating the wedge shape to rays defined by the entrance pupil of the lens system provides satisfactory distribution, over the recording area, of the wave lengths of the reflected light. As indicated in Fig. 5, such rays are defined by the open pupil E'*po* and the stopped down pupil E'*ps*. By relating the wedge configuration to these divergent rays of unequally oblique incidence, the wave lengths and intensities as received at points *o*, *p* and *q* can be adjusted to provide compensation or regulation within predictable limits of the field distribution of saturation, brightness and hue, while permitting interchangeable use of lens systems of different focal lengths.

In order to obtain from reflectors of this type reflection transmission characteristics similar to those shown in Fig. 3, the light entering the beam splitter must not have a large component of plane polarized light. Since some objects polarize the light they reflect, such plane polarized light is converted into circularly or elliptically polarized light by placing a quarter wave plate in front of the light dividing cube as indicated at Q of Fig. 1. The so-called acromatic quarter wave plate described in U. S. Patent No. 2,441,049 may be used which converts plane polarized light into circularly polarized light over a fairly wide wave length range.

If the selectivity provided by the dichroic reflectors D1, D2 does not agree with the sensitivity characteristics of the emulsions used, filters may be interposed in the apertures, as indicated at F1 and F2 of Fig. 1.

Figure 6:
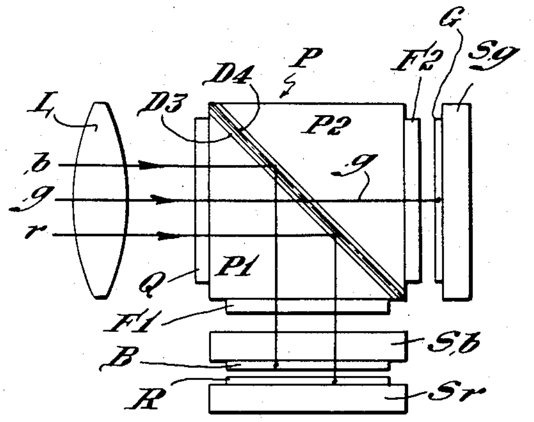
Fig. 6 is a view similar to Fig. 1 illustrating an embodiment with a red instead of blue reflecting front coating.

Instead of reflecting the higher, such as red wave length range from the rear and the lower such as blue wave length range from the first coating, this order can be reversed, as will now be understood without detailed description by referring to Fig. 6, which is derived from Fig. 1 and carries like identification marks to indicate corresponding elements. In this figure, front coating D3, which is constructed similarly to component D2 of Fig. 2, reflects red and transmits blue and green light, whereas rear coating D4, similar to component D1 of Fig. 2, reflects blue and transmits green light.

If optimum efficiency is to be obtained with coatings including zinc sulfide as dielectric layer material, the arrangement according to Fig. 1 is preferable because zinc sulphide absorbs some light in the blue range. If the blue reflecting coating is arranged in back of the red reflector, as shown in Fig. 6, the blue beam has to pass considerably more zinc sulphide as compared to the arrangement according to Fig. 1, so that some of that light is lost before this beam reaches emulsion B.

It will be evident that superimposed dichroic coatings according to the invention can be applied not only to cubical systems of the type herein described but to any light dividing or combining system of convenient or otherwise preferred construction, and it will be further understood that the principle of the invention can be applied to other spectral ranges than those specifically referred to above.

It should be understood that the present disclosure is for the purpose of illustration only and that this invention includes all modifications and equivalents which fall within the scope of the appended claims.

I claim:

1. Optical apparatus for dividing or combining light beams of three substantially distinct colors with peaks of substantially distinct wave lengths, comprising optical means having an entrance aperture for transmitting a beam of light containing said colors; a light transmitting body having a surface obliquely arranged with respect to said entrance aperture and adapted to intersect said beam; on said surface a first optical interference coating having alternate layers of optical media of respectively high and low refractive indexes and of respective thicknesses for selectively transmitting light of one color of a peak wave length within a given intermediate spectral color range and for also selectively transmitting light of a second color of a peak wave length within a second spectral color range adjacent on one side of said intermediate spectral color range, and for selectively reflecting light of a third color of a peak wave length within a third spectral color range adjacent on the other side of said intermediate spectral color range; and on said surface, superimposed on said first optical interference coating, a second optical interference coating having alternate layers of optical media of respectively high and low refractive indexes and of respective thicknesses for selectively transmitting light of said first color of a peak wavelength within said given intermediate spectral color range and for also selectively transmitting light of said third color of a peak wave length within said third spectral color range, and for selectively reflecting light of said second color of a peak wave length within said second spectral color range; the transmitting and reflecting ranges of said first and said second coatings being superimposed such that said coatings together transmit one component beam of said intermediate spectral color range and together reflect a second component beam composed of said second and third spectral color ranges.

2. Optical apparatus for dividing or combining light beams of the essentially blue, green and red spectral ranges, comprising optical means having an entrance aperture for transmitting a beam of light containing said ranges; a light transmitting body having a surface obliquely arranged with respect to said entrance aperture and adaped to intersect said beam; on said surface next to said aperture, a first optical interference coating having alternate layers of optical media of respectively high and low refractive indexes and of respective thicknesses for selectively transmitting a band of green light and a band of red light, and for selectively reflecting a band of blue light spectrally spaced from said band of red light; and on said surface, superimposed on the exit side of said first optical interference coating, a second optical interference coating having alternate layers of optical media of respectively high and low refractive indexes and of respective thicknesses for selectively transmitting said band of green light and for selectively reflecting said band of red light; the transmitting and reflecting ranges of said first and said second coatings being superimposed such that said coatings together transmit a green band component beam and together reflect a blue and red band component beam.

3. Optical apparatus for dividing or combining light beams of the essentially blue, green and red spectral ranges, comprising optical means having an entrance aperture for transmitting a beam of light containing said ranges; a light transmitting body having a surface obliquely arranged with respect to said entrance aperture and adapted to intersect said beam; on said surface next to said aperture, a first optical interference coating having alternate layers of optical media of respectively high and low refractive indexes and of respective thicknesses for selectively transmitting a band of green light and a band of blue light, and for selectively reflecting a band of red light spectrally spaced from said band of red light; and on said surface, superimposed on the exit side of said first optical interference coating, a second optical interference coating having alternate layers of optical media of respectively high and low refractive indexes and of respective thicknesses for selectively transmitting said band of green light and for selectively reflecting said band of blue light; the transmitting and reflecting ranges of said first and said second coatings being superimposed such that said coatings together transmit a green band component beam and together reflect a blue and red band component beam.

4. Apparatus according to claim 1 wherein said coatings are wedge shaped with the thinner edges towards said composite beam, such as to compensate for unequally oblique incidence thereon of divergent rays of said beam.

5. Apparatus according to claim 1 wherein said coatings are in essentially direct superimposition on said surface.

6. Apparatus according to claim 1 wherein said surface is contained within said body.

7. Apparatus according to claim 1 wherein said body has two portions with adjacent surfaces forming an internal surface, said coatings being applied to one of said surfaces.

8. Apparatus according to claim 7 wherein both coatings are in essentially direct superimposition on one of said adjacent surfaces and cemented to the other adjacent surface.

9. Apparatus according to claim 2 wherein one of said media absorbs blue light, said absorption being rendered comparatively ineffective by the reflection of blue light in said first coating.

References Cited in the file of this patent

UNITED STATES PATENTS

| | | |
|---|---|---|
| 2,000,058 | Ball | May 7, 1935 |
| 2,392,978 | Dimmick | Jan. 15, 1946 |
| 2,418,627 | Dimmick | Apr. 8, 1947 |
| 2,560,351 | Kell et al. | July 10, 1951 |
| 2,589,930 | Dimmick et al. | Mar. 18, 1952 |
| 2,642,487 | Schroeder | June 16, 1953 |

FOREIGN PATENTS

| | | |
|---|---|---|
| 716,153 | Germany | Jan. 14, 1942 |
| 586,957 | Great Britain | Apr. 9, 1947 |